United States Patent [19]

Misan

[11] 3,963,084

[45] June 15, 1976

[54] THREE WHEEL AGRICULTURAL TRACTION UNIT

[75] Inventor: Peter Misan, Nelson, Canada

[73] Assignee: The Raymond Lee Organization, New York, N.Y.

[22] Filed: June 25, 1975

[21] Appl. No.: 590,125

[52] U.S. Cl. ............................. 180/26 A; 180/1 F; 180/27; 180/43 R; 180/89 R; 280/261; 280/282

[51] Int. Cl.² ........................................ B62D 61/06

[58] Field of Search .................. 180/26 A, 26 R, 27, 180/33 B, 1 F, 43 A, 43 R, 25 R, 89 R; 280/261, 282

[56] References Cited
UNITED STATES PATENTS

| | | |
|---|---|---|
| 1,371,859 | 3/1921 | Carpenter ........................ 180/43 A |
| 2,128,119 | 8/1938 | Carter ................................ 180/43 |
| 2,773,392 | 12/1956 | Cizek ................................ 180/25 R |
| 3,403,745 | 10/1968 | Commons ......................... 180/26 R |
| 3,513,925 | 5/1970 | Figura .............................. 180/25 R |
| 3,738,440 | 6/1973 | Storm ............................ 180/26 R X |
| 3,746,113 | 7/1973 | Tidwell ......................... 180/26 A X |

*Primary Examiner*—M. H. Wood, Jr.
*Assistant Examiner*—John P. Silverstrim
*Attorney, Agent, or Firm*—Stephen Wyden

[57] ABSTRACT

An agricultural traction unit using a motor and transmission with two outputs to drive the front wheels and the rear wheel using chain and sprockets to transmit the power, having room for several passengers, a running board to rest the user's feet, and a storage platform with a rail.

1 Claim, 3 Drawing Figures

U.S. Patent   June 15, 1976   3,963,084
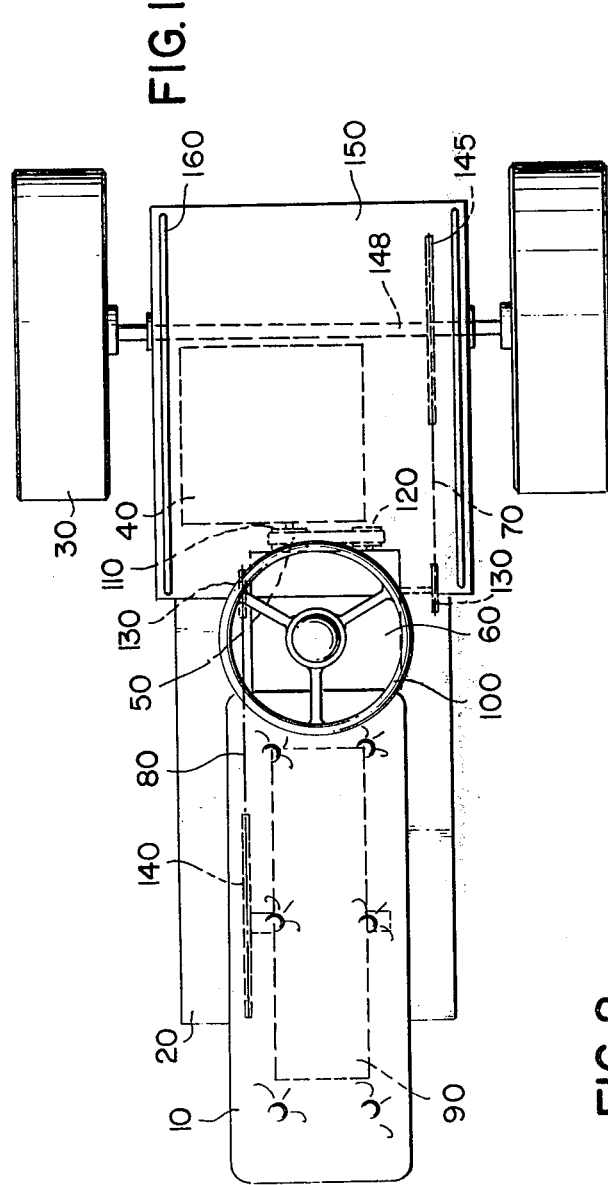
FIG.1
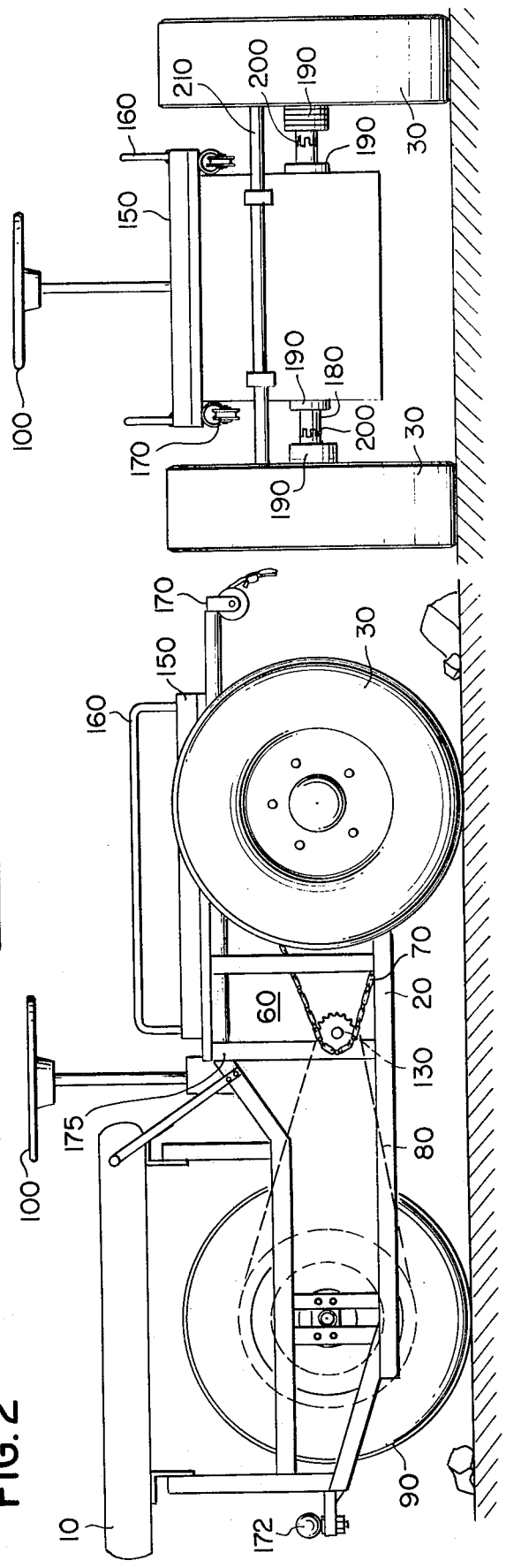
FIG.3
FIG.2

THREE WHEEL AGRICULTURAL TRACTION UNIT

I have invented a new and novel three wheel agricultural traction unit with positive prime on all three wheels. The model that has been constructed uses the two front wheels for steering and has climbed grades steeper than 45, climbed stairs, gone over 3 foot logs, and pulled an 18 ft. boat up a 10 grade.

The invention can be understood in view of the accompanying diagrams.

FIG. 1 is a top view looking down on the vehicle.
FIG. 2 is a side view of the vehicle.
FIG. 3 is a front view of the vehicle.

In FIG. 1, the traction unit has a long seat for a driver and a passenger 10, a running board for the user's feet 20, two front wheels 30, a motor 40 connected by a chain 50 to a transmission 60 which is connected by a chain 70 to the front wheels 30 and by another Chain 80 to the rear wheel 90. The steering wheel 100 is also visible as are the sprockets that connect the chains to the motor 110 and the transmission 120 and the transmission 130 and the wheels 140, 145. The sprocket 145 drives the front wheels through an axle 148. Over the engine 40 is a storage platform 150 with rails 160.

In FIG. 2, a hitch 170 for connecting attachments to the front and a ball tow hitch 172 for attaching equipment to the rear of the unit can be seen attached to the frame 175. In addition, the seat 10, the steering wheel 100, the rear wheel 90, the storage platform 150 and rail 160, one of the front wheels 30, the running board 20, all connected to the frame 175 and the sprocket 130 from the transmission 60 and the chain 70 connected to the front wheel 30 and, in phantom, the chain 80 connecting the transmission 60 to the rear wheel sprocket 140 are visible.

In FIG. 3, the steering wheel 100 can be seen above the storage platform 150 and rail 160. The hitch 170 is attached below the platform 150. The front wheels 30 are connected by an axle 180 having two pairs of universals 190 with a spline 200 between each pair of universals 190 which facilitate steering the unit. The steering of the front wheels is controlled by a steering control bar 210 which rotates the front wheels towards the left or right.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. An agricultural traction unit, comprising:
a frame,
a hitch attached to the frame,
a seat mounted on the frame,
a storage platform mounted on the frame,
a rail mounted on the storage platform,
a running board mounted on the frame, whereby a user can rest his feet while using the unit,
a driving mechanism attached to the frame, comprising:
   a motor driving a sprocket,
   a transmission connected to a sprocket, the transmission sprocket connected to the motor sprocket by a chain,
   an output of the transmission connected to a sprocket driving a chain that drives a sprocket connected to an axle, a pair of front wheels driven by the axle, and
   another output of the transmission connected to another sprocket driving another chain connected to a sprocket attached to a rear wheel, whereby the rear wheel may be driven
a steering mechanism, comprising:
   a steering wheel,
   a universal joint connected to each front wheel,
   a spline connected to the universal joint
   another universal joint connected to the spline and connected to the front axle and
   means of rotating the front wheels in the horizontal plane driven from the steering wheel.

* * * * *